US011389725B2

(12) United States Patent
Kmita et al.

(10) Patent No.: US 11,389,725 B2
(45) Date of Patent: Jul. 19, 2022

(54) REBALANCING OF IN-GAME ACTIVITY IN MULTIPLAYER VIDEO GAMES

(71) Applicant: SQUARE ENIX LTD., London (GB)

(72) Inventors: Bartosz Kmita, Warsaw (PL); Piotr Nowakowski, Warsaw (PL)

(73) Assignee: SQUARE ENIX LTD., London (GB)

( * ) Notice: Subject to any disclaimer, the term of this patent is extended or adjusted under 35 U.S.C. 154(b) by 14 days.

(21) Appl. No.: 17/057,507

(22) PCT Filed: Mar. 5, 2020

(86) PCT No.: PCT/GB2020/050528
§ 371 (c)(1),
(2) Date: Nov. 20, 2020

(87) PCT Pub. No.: WO2021/176189
PCT Pub. Date: Sep. 10, 2021

(65) Prior Publication Data
US 2022/0047949 A1 Feb. 17, 2022

(51) Int. Cl.
*A63F 13/67* (2014.01)
*A63F 13/58* (2014.01)
(Continued)

(52) U.S. Cl.
CPC .............. *A63F 13/58* (2014.09); *A63F 13/67* (2014.09); *A63F 13/843* (2014.09); *A63F 13/847* (2014.09)

(58) Field of Classification Search
CPC ...................................................... A63F 13/67
See application file for complete search history.

(56) References Cited

U.S. PATENT DOCUMENTS

| 6,302,792 B1 * | 10/2001 | Arai ........................ A63F 13/47 463/43 |
| 9,299,080 B2 * | 3/2016 | Dawson ................. G06Q 30/02 |

(Continued)

FOREIGN PATENT DOCUMENTS

| EP | 0885638 A1 | 12/1998 |
| JP | 2019162220 A | 9/2019 |

OTHER PUBLICATIONS

"How does Terraria scale enemy spawning in multiplayer," available at https://gaming.stackexchange.com/questions/24031/how-does-terraria-scale-enemy-spawning-in-multiplayer, Jun. 6, 2011 (Year: 2011).*

(Continued)

*Primary Examiner* — Jay Trent Liddle
(74) *Attorney, Agent, or Firm* — Fenwick & West LLP

(57) ABSTRACT

A computer-readable medium including a program which is executed by at least a first and second computer apparatus in a network to provide a video game that is progressed by at least first and second players using said first and second computer apparatus respectively controlling at least first and second player characters in a virtual multiplayer game world in which the difficulty of the game is defined by at least an enemy difficulty, wherein the virtual multiple player game world comprises at least one gaming arena and has at least one game level, the program causing the computer apparatus to function as: an enemy difficulty determining unit configured to detect a change in the number of player characters and to determine a new enemy difficulty in dependence on the change in the number of player characters; an enemy modulating unit configured to modulate the enemy difficulty to the determined new enemy difficulty; and an enemy generating unit configured to generate at least one enemy (Continued)

character at a rate, and/or having an enemy attribute, according to the determined new enemy difficulty.

15 Claims, 15 Drawing Sheets

(51) Int. Cl.
 *A63F 13/843* (2014.01)
 *A63F 13/847* (2014.01)

(56) References Cited

U.S. PATENT DOCUMENTS

| | | | | |
|---|---|---|---|---|
| 10,286,323 B2* | 5/2019 | Aghdaie | ............... | A63F 13/67 |
| 11,065,545 B2* | 7/2021 | DeVico | ............... | A63F 13/67 |
| 2002/0090995 A1 | 7/2002 | Haga et al. | | |
| 2010/0304839 A1* | 12/2010 | Johnson | ............... | A63F 13/67 |
| | | | | 463/43 |
| 2016/0067612 A1* | 3/2016 | Ntoulas | ............... | A63F 13/67 |
| | | | | 463/29 |
| 2017/0333795 A1* | 11/2017 | Hardee | ............... | A63F 13/35 |
| 2018/0280797 A1* | 10/2018 | Murakami | ............ | A63F 13/34 |
| 2019/0091582 A1* | 3/2019 | Reiche, III | ........... | A63F 13/795 |
| 2020/0061474 A1 | 2/2020 | Ohashi | | |
| 2021/0082255 A1* | 3/2021 | Pierce | ............... | G07F 17/3295 |

OTHER PUBLICATIONS

"MonsterHunterWorld Reddit" available at https://www.reddit.com/r/MonsterHunterWorld/comments/e5xx2j/how_does_multiplayer_monster_health_scale_midfight/, Dec. 4, 2019 (Year: 2019).*

"Diablo 3's current state (Solo vs Group)" available at https://us.forums.blizzard.com/en/d3/t/diablo-3s-current-state-solo-vs-group/14285/122, Mar. 28, 2020 (Year: 2020).*

PCT International Search Report and Written Opinion, PCT Application No. PCT/GB2020/050528, dated Feb. 12, 2021, 20 pages.

* cited by examiner

| Player character table | | | | | | | |
|---|---|---|---|---|---|---|---|
| Player character ID | Host status | Connection speed ranking | Game level reached | Player character experience | Player character skill level | Player character ability | Player character strength value |
| Player 1 | Host | 1 | 3 | 3 | Low | Melee | 9 |
| Player 2 | Not host | 2 | 4 | 4 | High | Archery | 12 |

FIG. 11

| Enemy difficulty table | | | |
|---|---|---|---|
| Number of player character | Player character strength value | Game level | Enemy difficulty value |
| 1 | 9 | 3 | 3 |
| 2 | 21 | 3 | 4 |
| 3 | 32 | 3 | 5 |
| 4 | 38 | 3 | 6 |
| 1 | 9 | 4 | 5 |
| 2 | 21 | 4 | 6 |
| 3 | 32 | 4 | 7 |
| 4 | 38 | 4 | 8 |

FIG. 12

| Player character count table | |
|---|---|
| Number of player characters in Phase A | 2 |
| Number of player characters in Phase B | 0 |
| Number of player characters in Phase C | 0 |
| Number of player characters in Phase D | 0 |
| Number of player characters in Phase E | 0 |
| Number of player characters in Phase F | 0 |
| Number of player characters in gaming arena | 2 |

FIG. 13

Enemy generation table

| Enemy difficulty value | Enemy character generation rate | Enemy character attribute value |
|---|---|---|
| 3 | 2 | 3 |
| 4 | 3 | 3 |

FIG. 14

Enemy character attribute lookup table

| Enemy character attribute value | Enemy health | Enemy damage | Enemy resistance | Enemy armour | Enemy type | Enemy strength | Enemy equipment | Enemy skill | Enemy ability |
|---|---|---|---|---|---|---|---|---|---|
| 1 | 5 | 8 | 1 | 2 | Pawn | 5 | Axe | Low | Group attack |
| 2 | 7 | 8 | 2 | 2 | Pawn | 5 | Axe | Low | Group attack |
| 3 | 10 | 9 | 2 | 2 | Tank | 10 | Club | High | Extra armour |

FIG. 15

REBALANCING OF IN-GAME ACTIVITY IN MULTIPLAYER VIDEO GAMES

FIELD OF THE INVENTION

The present invention relates to video games, and more particularly to a mechanism for rebalancing in-game activity in a multiplayer video game in response to players (and respective player characters controlled by said players) joining or leaving the game.

BACKGROUND OF THE INVENTION

In many network-based multiplayer video games (for example, but not limited to, massively multiplayer online games, or role-playing games), a so-called "player character", under the control of a respective user, may be tasked inter alia with defeating a series of enemy characters or groups of enemy characters. Such enemy characters are typically controlled by the video game program itself, i.e. are usually so-called "non-player characters", programmed to attack the player characters. The task of defeating the enemy characters may be carried out in collaboration with other player characters (controlled by respective users) within the video game. Player characters may also be allotted other roles in the game, instead of, or in addition to, fighting the enemy characters. (Incidentally, in the present disclosure it will generally be assumed that the player characters are the protagonists and thus "heroes" of the game, and that the non-player characters are the antagonists and thus enemies, but this need not necessarily be the case, and the present principles are equally applicable if the roles of the player characters and non-player characters are reversed.)

It should be noted that the term "user" as used herein may be used interchangeably with the term "player", and the two terms should be treated as synonymous.

For gameplay that is satisfying and enjoyable for the players, it is desirable that the fighting between the player characters and the enemy characters should feel balanced. That is to say, it should not be excessively difficult, nor too easy, to defeat the enemy characters in any given battle situation.

However, in a multiplayer game a player may decide to exit the video game (i.e. to "drop-out" from the game) at substantially any time during gameplay, leaving the remaining players and their respective player characters to fend for themselves in combatting the enemy characters. This may potentially upset the balance of the game between the remaining player characters and the enemy characters, as there will now be fewer player characters to combat the enemy characters, causing such combat to be more difficult. Consequently this may spoil the remaining players' enjoyment of the game.

Likewise, a player may wish to join (or re-join) an existing multiplayer game session (i.e. to "drop-in" to the game). This may also upset the balance of the game between the player characters and the enemy characters, as there will now be more player characters to combat the enemy characters, causing such combat to be made easier. This too may spoil the remaining players' enjoyment of the game.

Accordingly, there is a desire to adjust in-game activity within a multiplayer game session, to cater for dropping-out or dropping-in of players, in order to result in overall gameplay in which the interaction between the player characters and the enemy characters feels balanced, and is therefore satisfying and enjoyable for the players.

Moreover, each of the different player characters may have different skills and abilities, and the players who drop-in or drop-out of the game may have different levels of experience at playing the video game. Such factors can add to the difficulty of achieving balanced gameplay in a multiplayer game. It is therefore desirable that any adjustment of the gameplay to cater for dropping-out or dropping-in of players should also take into account differences in ability of the players and/or player characters.

Furthermore, with many multiplayer video games (as played by multiple players each operating a respective computer apparatus connected via a network such as the Internet), at least part of the video game may be hosted on the computer apparatus of at least one of the players. That is to say, that player's computer apparatus at least partially functions as a server that provides the game content to other players. In such a case, the sudden dropping-out of a player whose computer apparatus is currently hosting part or all of the video game can disrupt the running of the video game for the other players.

Moreover, players dropping-in to a multiplayer video game hosted at least in part on a remote host player's computer apparatus might not be able to achieve a good quality connection to the host's computer apparatus, particularly since the players may be distributed all over the world. For instance, if the connection is not of good quality, a player in Japan who has dropped-in to a video game hosted by a player in the United States may experience a noticeable delay between operation of their handheld game controller and the corresponding action of their player character in the game, and may therefore have a suboptimal experience of the game. There is therefore a desire to mitigate such an issue.

SUMMARY OF THE INVENTION

According to a first aspect of the invention there is provided a computer-readable medium including a program which is executed by at least a first and a second computer apparatus in a network to provide a video game that is progressed by at least first and second players respectively using said first and second computer apparatus and respectively controlling at least first and second player characters in a virtual multiplayer game world in which the difficulty of the game is defined by at least an enemy difficulty, wherein the virtual multiplayer game world comprises at least one gaming arena and has at least one game level, the program causing the computer apparatus to function as: an enemy difficulty determining unit configured to detect a change in the number of player characters and to determine a new enemy difficulty in dependence on the change in the number of player characters; an enemy modulating unit configured to modulate the enemy difficulty to the determined new enemy difficulty; and an enemy generating unit configured to generate at least one enemy character at a rate, and/or having an enemy attribute, according to the determined new enemy difficulty.

The concept of "enemy difficulty" is essentially the difficulty faced by the player characters in respect of defeating the enemy characters they encounter, and is discussed in greater detail below. The enemy difficulty may be a function of one or more of: the number of enemy characters present; the rate of generation of enemy characters; and attributes of the enemy characters (e.g. enemy health, enemy damage, enemy resistance, enemy armour, enemy type, enemy strength, enemy equipment, enemy skill and enemy ability).

By virtue of the operation of the enemy difficulty determining unit, the enemy modulating unit and the enemy generating unit, this advantageously enables the enemy characters to be rebalanced in response to player characters dropping-in or dropping-out of the video game, thereby rebalancing the in-game activity and enabling satisfying and enjoyable gameplay to be maintained despite the change in the number of player characters.

Preferably, the enemy generating unit is configured to decrease the rate of generation of enemy characters in response to the enemy difficulty determining unit detecting a reduction in the number of player characters, and/or to increase the rate of generation of enemy characters in response to the enemy difficulty determining unit detecting an increase in the number of player characters. This advantageously causes a corresponding decrease or increase in the number of enemy characters to whom the player characters are subjected, in response to player characters dropping-out from, or dropping-in to, the video game.

Alternatively, or in addition, the enemy modulating unit may be configured to modulate at least one enemy attribute of the enemy characters in response to the enemy difficulty determining unit detecting a change in the number of player characters. This advantageously adjusts the attributes of the enemy characters in response to player characters dropping-in or dropping-out of the video game.

In certain embodiments, the enemy modulating unit may be configured to apply the new enemy difficulty to existing enemy characters.

Alternatively, the enemy generating unit may be configured to apply the new enemy difficulty to newly-generated enemy characters.

The at least one enemy attribute may comprise one or more of: enemy health, enemy damage, enemy resistance, enemy armour, enemy type, enemy strength, enemy equipment, enemy skill and enemy ability.

The at least one gaming arena may comprise at least two gaming phases comprising at least a first gaming phase and a second gaming phase; and the enemy difficulty determining unit may be further configured to detect a change in the number of player characters in the first gaming phase and to determine a new enemy difficulty, for application in the second gaming phase (but not in the first gaming phase) in dependence on said change in the number of player characters in the first gaming phase. This provides the advantage that, following a change in the number of player characters, enemies in the player characters' current phase (the first phase) are not suddenly affected by the new enemy difficulty, which could otherwise appear incongruous to the users. Instead, new enemies in the subsequent phase (the second phase) are affected by the new enemy difficulty, thereby avoiding subjecting the users to a sudden change in the enemies.

Thus, the enemy modulating unit may be further configured to modulate the enemy difficulty of the second gaming phase to the determined new enemy difficulty.

To implement this, the enemy generating unit may be further configured to generate at least one enemy character at a rate, and/or having an enemy attribute, in the second gaming phase according to the determined new enemy difficulty.

More generally, the enemy difficulty modulating unit may be further configured to conflate said modulation of the enemy difficulty with a further modulation of the enemy difficulty due to a change in the game level of the video game. This advantageously combines the rebalancing of enemy characters with a difficulty change due to change in game level.

Alternatively, the enemy difficulty modulating unit may be further configured to conflate said modulation of the enemy difficulty with a further modulation of the enemy difficulty due to a change in the experience, skill or ability of at least one of the player characters. This advantageously combines the rebalancing of enemy characters with a difficulty change due to a change in player character ability.

As a further alternative, the enemy difficulty modulating unit may be further configured to conflate said modulation of the enemy difficulty with a further modulation of the enemy difficulty due to a change in the gaming arena of the player characters. This advantageously combines the rebalancing of enemy characters with a difficulty change due to change in gaming arena.

In certain embodiments, the game is at least partially hosted on the first computer apparatus, and the program further causes the computer apparatus to function as a hosting transfer unit, operable to transfer hosting responsibility from the first computer apparatus to another player's computer apparatus.

The hosting transfer unit may be configured such that, in the event that the first player initiates disconnection of the first computer apparatus from the network, hosting of the game is at least partially transferred to the second computer apparatus. Thus, advantageously, hosting responsibility may be transferred to the second computer apparatus in the event of disconnection of the first player's computer apparatus (as well as drop-out of the first player from the game).

Alternatively, the hosting transfer unit may be configured such that, in the event that a third player joins the game, over the network, using a third computer apparatus capable of providing faster hosting than the first computer apparatus, hosting of the game may at least partially be transferred to the third computer apparatus. Thus, advantageously, hosting responsibility may be transferred to the third computer apparatus in the event that the third player joins the game having a faster computer and/or faster connection to the network.

Optionally, the enemy difficulty may at least initially be based on a game level reached by the player of the computer apparatus that is currently hosting the game.

BRIEF DESCRIPTION OF THE DRAWINGS

Embodiments of the invention will now be described, by way of example only, and with reference to the drawings in which:

FIG. 11 is an illustrative example of a player character table, to which routines of certain embodiments may refer;

FIG. 12 is an illustrative example of an enemy difficulty table, to which routines of certain embodiments may refer;

FIG. 13 is an illustrative example of a player character count table, to which routines of certain embodiments may refer;

FIG. 14 is an illustrative example of an enemy generation table, to which routines of certain embodiments may refer;

FIG. 15 is an illustrative example of an enemy character attribute look-up table, to which routines of certain embodiments may refer.

DETAILED DESCRIPTION OF PREFERRED EMBODIMENTS

The present embodiments represent the best ways known to the Applicant of putting the invention into practice. However, they are not the only ways in which this can be achieved.

To adjust and rebalance in-game activity in a multiplayer video game in response to player drop-in or drop-out, embodiments of the present invention provide an enemy difficulty determining, enemy modulating and enemy generating routine that forms part of the video game.

The concept of "enemy difficulty" is essentially the difficulty faced by the player characters in respect of defeating the enemy characters they encounter, and is discussed in greater detail below. The enemy difficulty may be a function of one or more of: the number of enemy characters present; the rate of generation of enemy characters; and attributes of the enemy characters (e.g. enemy health, enemy damage, enemy resistance, enemy armour, enemy type, enemy strength, enemy equipment, enemy skill and enemy ability).

The video game is provided as a computer program. The computer program may be supplied on a computer-readable medium (e.g. a non-transitory computer-readable recording medium such as a CD or DVD) having computer-readable instructions thereon. Alternatively the computer program may be provided in a downloadable format, over a network such as the Internet, or may be hosted on a server.

Figure 1:
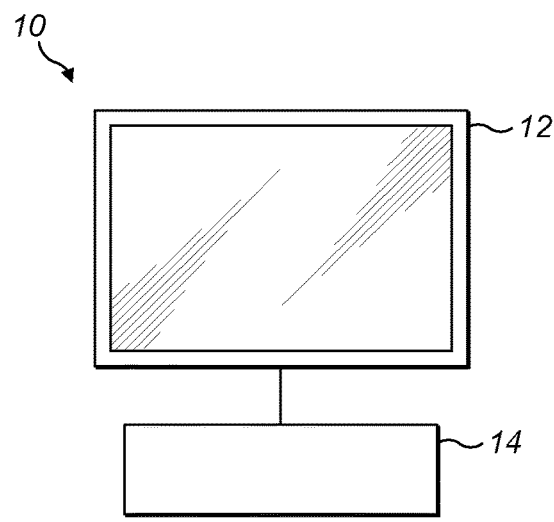
FIG. 1 schematically illustrates a video game apparatus (for example a personal computer or a video game console) on which a video game which incorporates an embodiment of the present invention may be played.

With reference to FIG. 1, the video game program may be executed on a video game apparatus 10, such as a personal computer or a video game console that is connected to a network such as the Internet. The video game apparatus 10 comprises a display screen 12 on which the video game is displayed, and a control unit 14 which typically includes at least a Central Processing Unit (CPU), a Read Only Memory (ROM) and a Random Access Memory (RAM). The control unit 14 may also include a Graphics Processing Unit (GPU) and a sound processing unit. The display screen 12 and the control unit 14 may be provided in a common housing, or may be separate connected units. The video game apparatus 10 also includes one or more user input devices by which the user can control a player character in the game. Such a user input device may comprise, for example, a mouse, a keyboard, a hand-held controller (e.g. incorporating a joystick and/or various control buttons), or a touchscreen interface integral with the display screen 12 (e.g. as in the case of a smartphone or a tablet computer).

Figure 2:
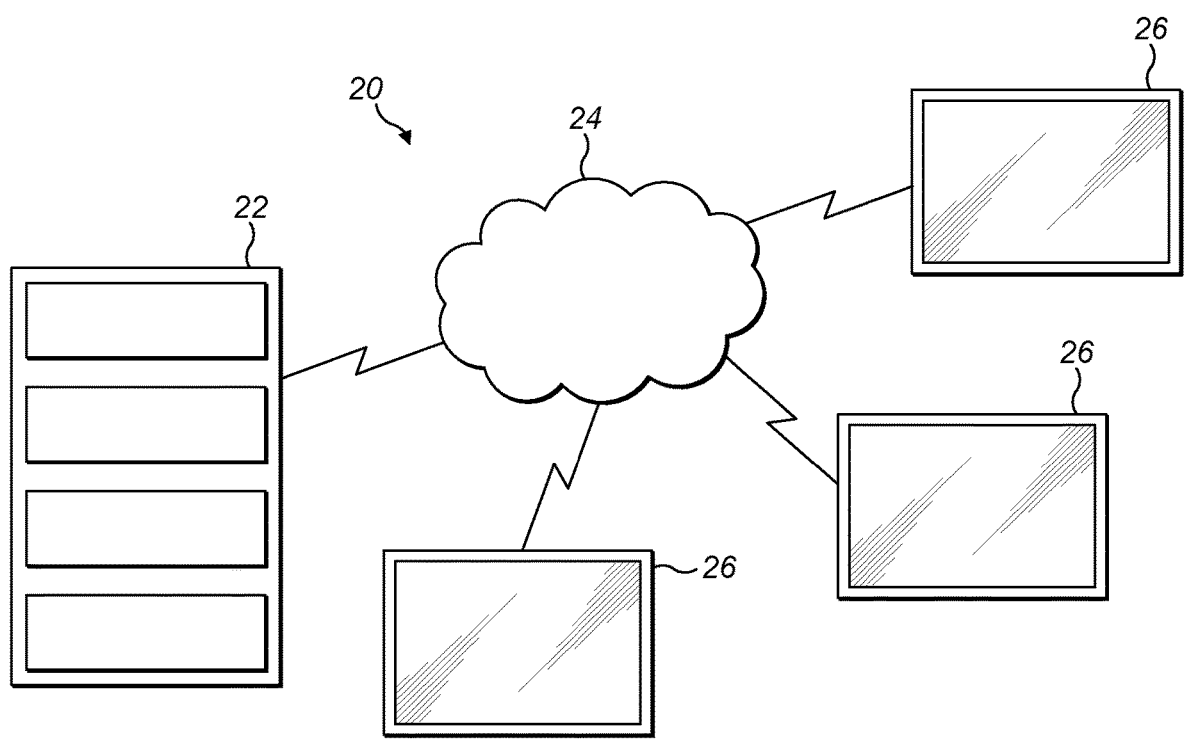
FIG. 2 schematically illustrates a network-based video game system comprising a server and a plurality of client terminals, on which terminals a video game which incorporates an embodiment of the present invention may be played.

Alternatively, with reference to FIG. 2, the video game program may be executed within a server-based video game system 20. The video game system 20 comprises a server device 22, a communication network 24 (e.g. the Internet), and a plurality of user terminals 26 operated by respective users. The server device 22 communicates with the user terminals 26 through the communication network 24. Each user terminal 26 may comprise a network-connected video game apparatus 10 as described above, such as a personal computer or a video game console, or a smartphone, a tablet computer, or some other suitable piece of user equipment. The video game program may be at least partly executed on the server 22, which may stream user-specific game content (e.g. video in real time) to each of the plurality of user terminals 26. At each user terminal the respective user can interact with the game and provide input that is transmitted to the server 22, to control the progress of the game for the user. Alternatively, for a given user, the video game program may be executed within the respective user terminal 26, which may interact with the server 22 when necessary.

In any case, the video game progresses in response to user input, with the user input controlling a player character. A given user's display screen may display the respective player character's field of view in the game world in a "first-person" manner, preferably in three dimensions, and preferably using animated video rendering (e.g. photorealistic video rendering in particular), in the manner of a virtual camera.

Alternatively, the user's display screen may display the player character and other objects or characters in the game world in a "third-person" manner, again preferably in three dimensions, and preferably using animated video rendering (e.g. photorealistic video rendering in particular), in the manner of a virtual camera.

Figure 3:
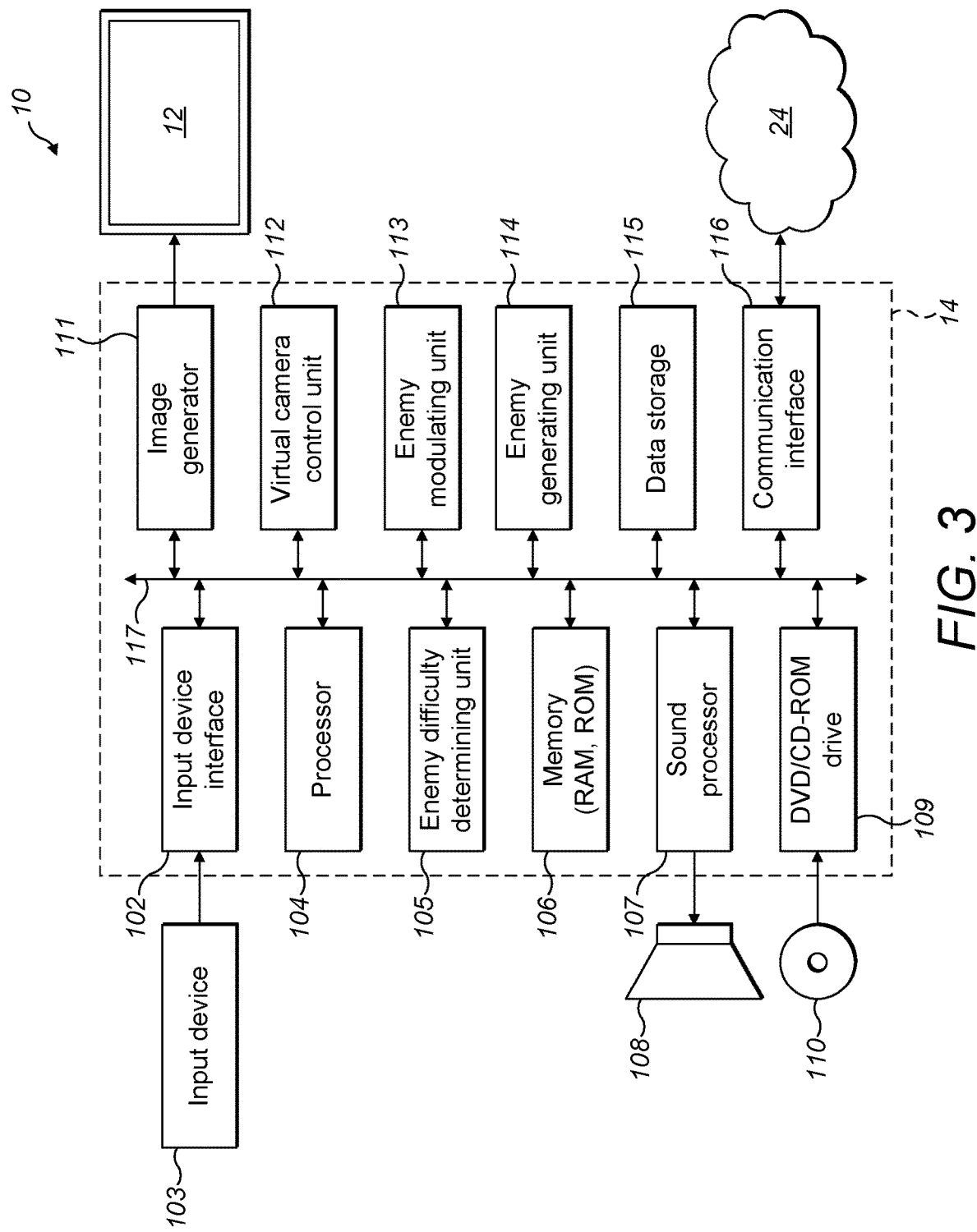
FIG. 3 is a block diagram showing the configuration of a video game apparatus as shown in FIG. 1.

FIG. 3 is a block diagram showing the configuration of the video game apparatus 10 shown in FIG. 1, in the case of the game being executed on such apparatus. It will be appreciated that the contents of the block diagram are not exhaustive, and that other components may also be present.

As illustrated, the control unit 14 of the video game apparatus 10 includes an input device interface 102 to which an input device 103 (e.g. a mouse, a keyboard or a hand-held controller, e.g. incorporating a joystick and/or various control buttons, as mentioned above) is connected, a processor (e.g. CPU) 104, and an image generator (e.g. GPU) 111 to which a display unit 12 is connected.

The control unit 14 also includes memory (e.g. RAM and ROM) 106, a sound processor 107 connectable to a sound output device 108, a DVD/CD-ROM drive 109 operable to receive and read a DVD or CD-ROM 110 (both being examples of a computer-readable recording medium), a communication interface 116 connectable to the communication network 24 (e.g. the Internet), and data storage means 115 via which data can be stored on a storage device (either within or local to the video game apparatus 10, or in communication with the control unit 14 via the network 24).

The video game program causes the control unit 14 to take on further functionality of an enemy difficulty determining unit 105, a virtual camera control unit 112, an enemy modulating unit 113, and an enemy generating unit 114.

An internal bus 117 connects components 102, 104, 105, 106, 107, 109, 111, 112, 113, 114, 115 and 116 as shown.

Figure 4:
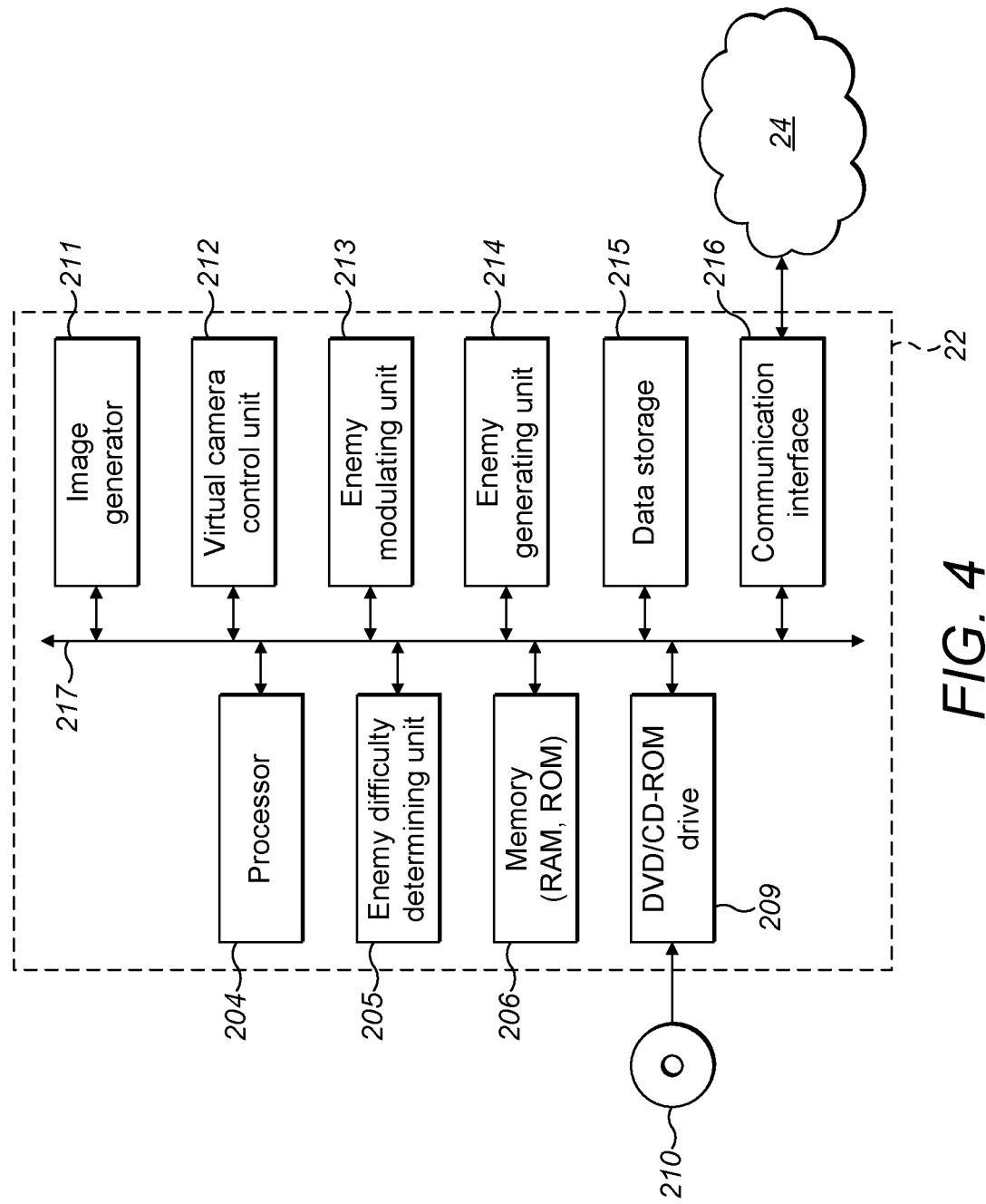
FIG. 4 is a block diagram showing the configuration of a server as shown in FIG. 2.

FIG. 4 is a block diagram showing the configuration of the server apparatus 22 shown in FIG. 2, in the case of the game being executed within a server-based video game system. It will be appreciated that the contents of the block diagram are not exhaustive, and that other components may also be present.

As illustrated, the server apparatus 22 includes a processor (e.g. CPU) 204, and an image generator (e.g. GPU) 211, memory (e.g. RAM and ROM) 206, a DVD/CD-ROM drive 209 operable to receive and read a DVD or CD-ROM 210 (both being examples of a computer-readable recording medium), a communication interface 216 connected to the communication network 24 (e.g. the Internet), and data storage means 215 via which data can be stored on a storage device (either within or local to the server apparatus 22, or in communication with the server apparatus 22 via the network 24).

The video game program causes the server apparatus 22 to take on further functionality of an enemy difficulty determining unit 205, a virtual camera control unit 212, an enemy modulating unit 213, and an enemy generating unit 214.

An internal bus 217 connects components 204, 205, 206, 209, 211, 212, 213, 214, 215 and 216 as shown.

Via the communication interface 216 and the network 24, the server apparatus 22 may communicate with a user terminal 26 (e.g. video game apparatus 10) as mentioned above, during the course of the video game. Amongst other things, the server apparatus 22 may receive user input from the input device 103 of the video game apparatus 10, and may cause video output to be displayed on the display screen 12 of the video game apparatus 10.

Enemy Difficulty Balancing

In accordance with the present disclosure, to rebalance the in-game activity and maintain a difficulty of a multiplayer video game despite a player leaving or joining the game, the enemy difficulty is modulated to a new enemy difficulty following a change in the number of player characters.

As described above, the video game program may be executed on a network-connected video game apparatus 10, or within a server-based video game system 20. Moreover, instead of being hosted by a server, one or more selected user terminals 26 may at least partially host the game.

The video game may be progressed by at least first and second players using, respectively, a first and a second network-connected computer apparatus (e.g. 10 or 26), respectively controlling first and second player characters in a virtual game world comprising at least one gaming arena and having at least one game level. The difficult of such a game to the players is determined by at least the enemy difficulty.

Figure 5:
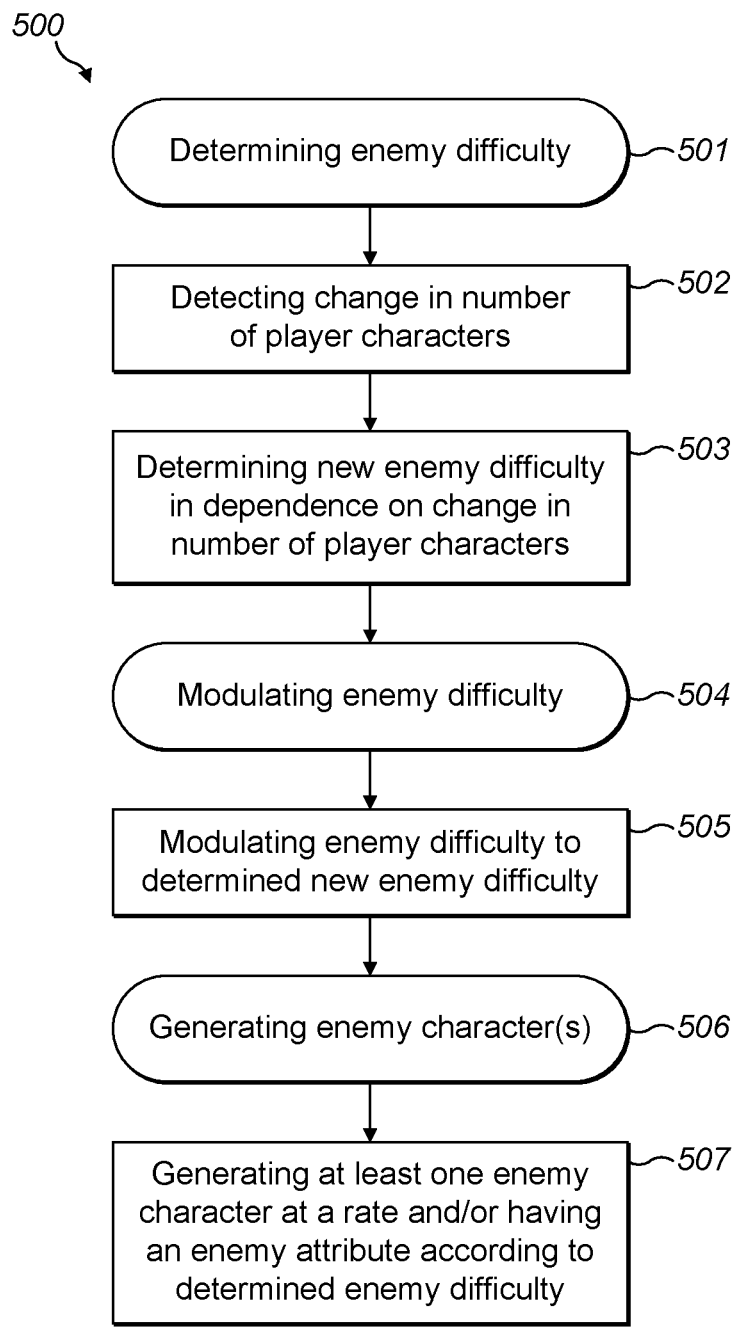
FIG. 5 is a procedural flow diagram of an enemy difficulty determining, enemy difficulty modulating, and enemy character generating routine according to embodiments of the invention, in which enemy character(s) are generated in response to a change in the number of player characters.

FIG. 5 is a procedural flow diagram of an enemy difficulty determining, enemy modulating, and enemy generating routine 500 according to embodiments of the invention, in which at least one enemy character is generated at a rate and/or having an enemy attribute according to a determined enemy difficulty, responsive to a change in the number of player characters resulting from player drop-in or drop-out.

The overall routine 500 comprises three main processes: determining enemy difficulty 501, modulating enemy difficulty 504, and generating enemy character(s) 506.

Following the initiation of the routine 500, triggered by a change in the number of player characters, the routine causes the enemy difficulty determining unit 105/205 to detect 502 the change in the number of player characters, and to determine 503 a new enemy difficulty in dependence on the change in the number of player characters. Examples of changes in the number of player characters are described below with reference to FIGS. 6, 7, 9*a*, 9*b* and 10*a* to 10*c*. Examples of a new enemy difficulty are described below with reference to FIG. 12.

Continuing with the routine 500 illustrated in FIG. 5, once a new enemy difficulty has been determined, the enemy difficulty is modulated to the new enemy difficulty 505 by the enemy modulating unit 113/213. Examples of such modulation are described below with reference to FIG. 12.

Following the modulation of the enemy difficulty to the new enemy difficulty 505, at least one enemy character is generated 507 by the enemy generating unit 114/214 at a rate and/or having an enemy attribute according to the determined enemy difficulty. Examples of such enemy generating are described below with reference to FIGS. 7, 9*b*, 10*b* and 10*c*.

In particular, the enemy generating unit 114/214 may be configured to decrease the rate of generation of enemy characters in response to the enemy difficulty determining unit 105/205 detecting a reduction in the number of player characters, and/or to increase the rate of generation of enemy characters in response to the enemy difficulty determining unit 105/205 detecting an increase in the number of player characters. It will be appreciated that changing the rate of generation of enemy characters results in a change in the number of enemy characters encountered by the player characters.

Alternatively, or in addition, the enemy modulating unit 113/213 may be configured to modulate at least one enemy attribute of the enemy characters in response to the enemy difficulty determining unit 105/205 detecting a change in the number of player characters.

The enemy modulating unit 113/213 may be configured to apply the new enemy difficulty to existing enemy characters encountered by the player characters.

Figure 6:
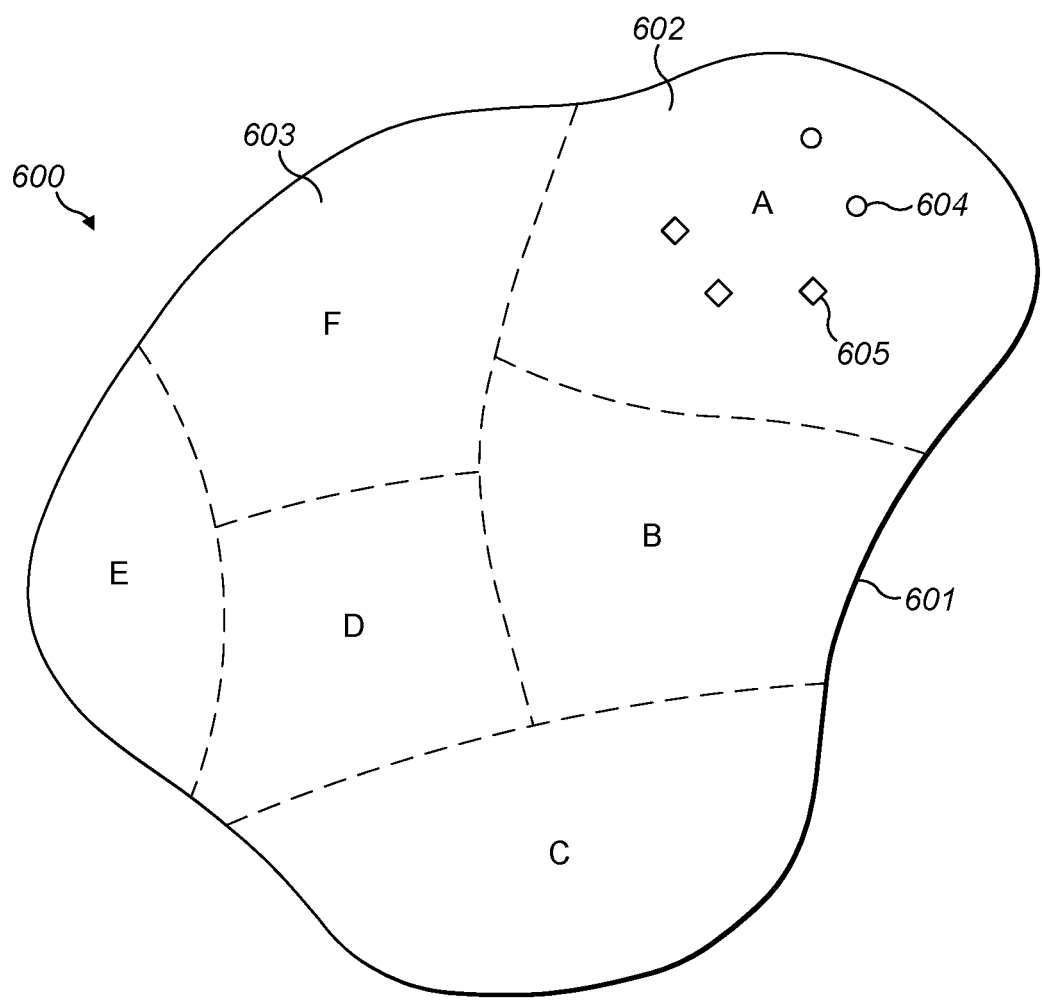
FIG. 6 depicts an exemplary virtual multiplayer game world comprising a plurality of gaming phases (A to F), to illustrate an embodiment of the invention.

Alternatively, the enemy generating unit 114/214 may be configured to apply the new enemy difficulty to newly-generated enemy characters, e.g. in the player characters' current phase of the game, or in the next phase that the player characters enter. The concept of phases of the game will be described next. Referring now to FIG. 6, the video game of the present invention is progressed through a virtual multiplayer game world 600 such as the one shown in FIG. 6.

As shown in FIG. 6, the virtual multiplayer game world 600 comprises a gaming arena 601. In the example depicted in FIG. 6 the gaming arena 601 is made up of six gaming phases 602, 603 labelled A to F.

Figure 8A:
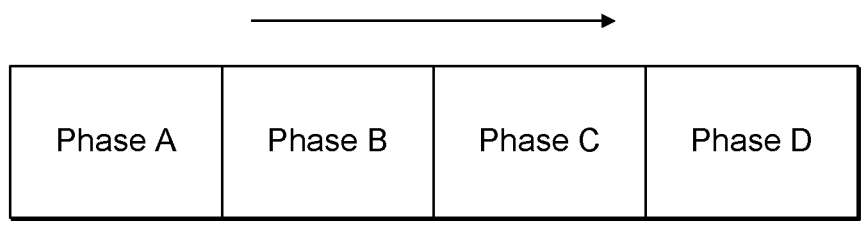
FIGS. 8a and 8b are flow diagrams depicting progress through a video game by phase and level respectively.

Referring to FIGS. 6 and 8*a*, the gaming phases 602, 603 are arranged so that the game may be progressed though a consecutive order of gaming phases 602, 603. In the illustrated example, the first gaming phase 602 is labelled A, the second gaming phase is labelled B, and so on, through to the last gaming phase 603 which is labelled F. The player progresses through the video game by progressing through the gaming phases A to F consecutively.

Figure 8B:
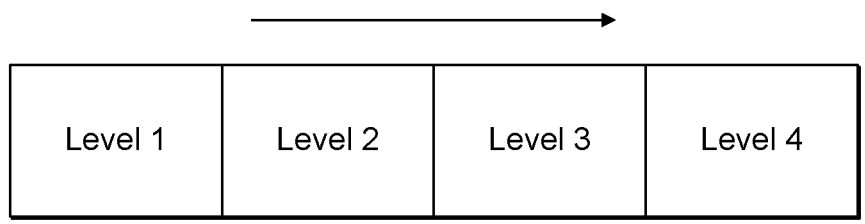

Referring now to FIG. 8b, in a game there may be more than one gaming arena, each with a corresponding game level (e.g. levels 1 to 4). Equally there may be more than one game level (e.g. levels 1 to 4) within a single gaming arena.

In the illustrated example, taking FIGS. 8a and 8b together, each phase A-D has a corresponding game level 1-4, with the game level increasing incrementally and correspondingly to the consecutive increase of the gaming phase. In other words, the first gaming phase A has the first game level (level 1) and the second gaming phase B has the second game level (level 2), and so on.

As mentioned above, the enemy generating unit 113/213 may be configured to apply the new enemy difficulty to newly-generated enemy characters. These may be in the player characters' current phase of the game, or in the next phase that the player characters enter.

Examples of Changing Enemy Difficulty

The following are examples of changing the enemy difficulty following drop-in or drop-out of player characters.

Drop-in of Player Characters

To begin with, FIG. 6 depicts two player characters 604 in the first gaming phase 602 (phase A) along with three enemy characters 605.

Figure 7:
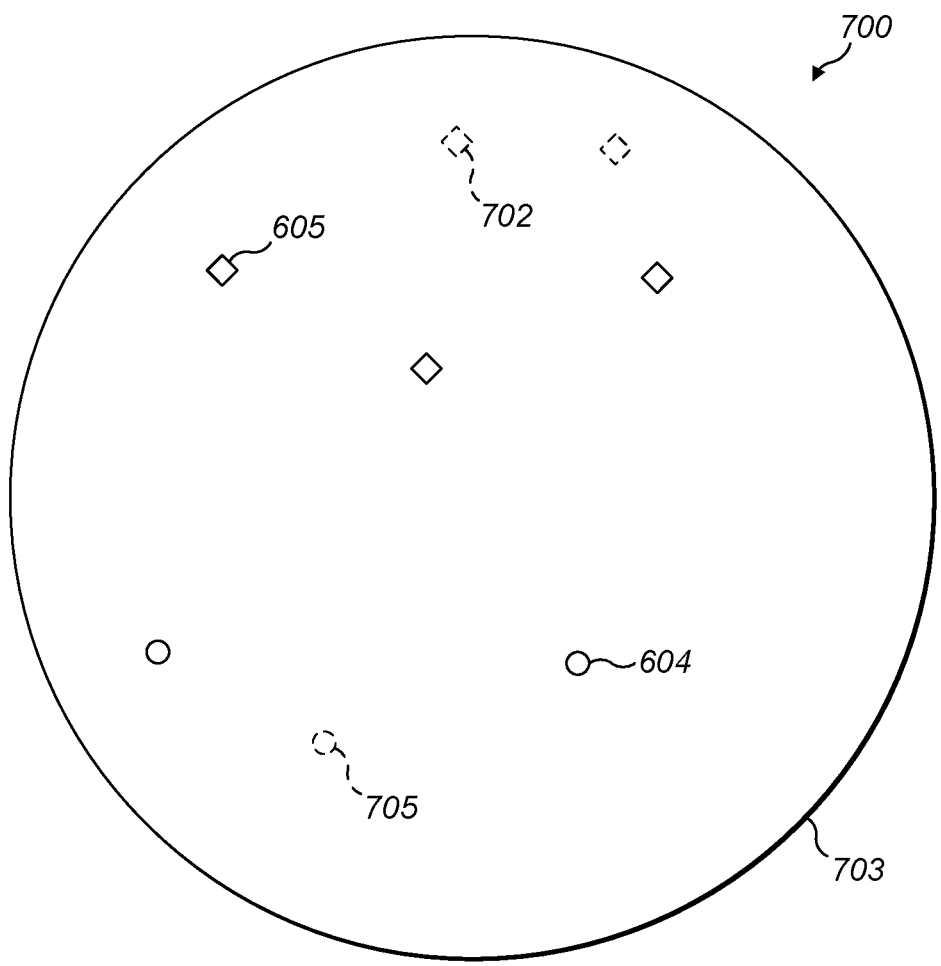
FIG. 7 depicts an enlargement of a region within phase A of FIG. 6.

FIG. 7 shows an enlarged view 700 of a region 703 within the first gaming phase 602 (phase A), in which the two player characters 604 are in the process of being joined by a third player character 705 who is dropping-in to the game. In the manner outlined above with reference to FIG. 5, in response to this increase in the number of player characters the enemy generating unit 114/214 increases the rate of generation of the enemy characters 605. This has the effect of generating two additional enemy characters 702, thus maintaining a suitable level of difficulty for the increased number of player characters 604, 705 in the game, and rebalancing the gameplay.

Figure 9A:
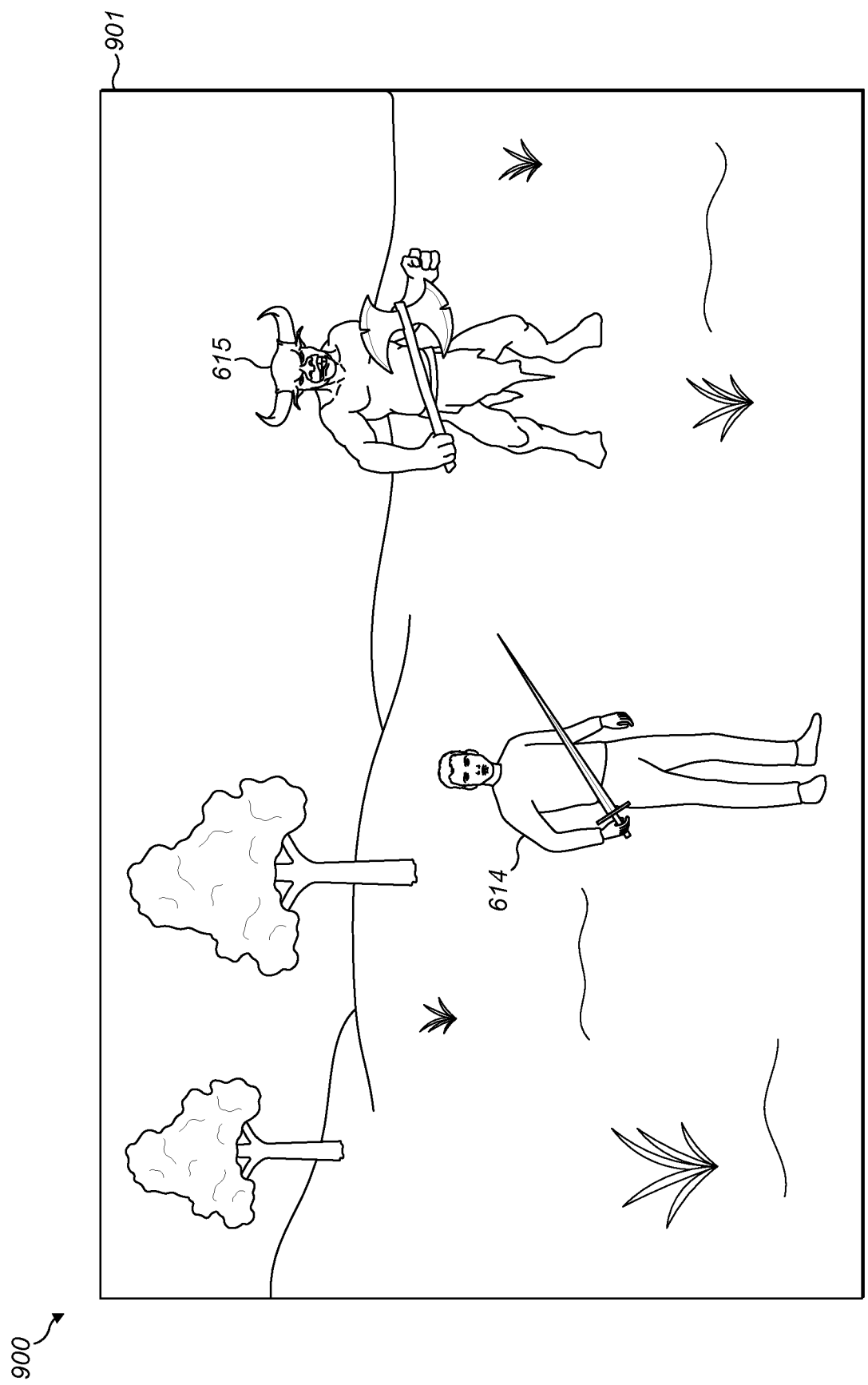
FIG. 9a depicts a screenshot, from a third-person perspective, of a player character and an enemy character.
Figure 9B:
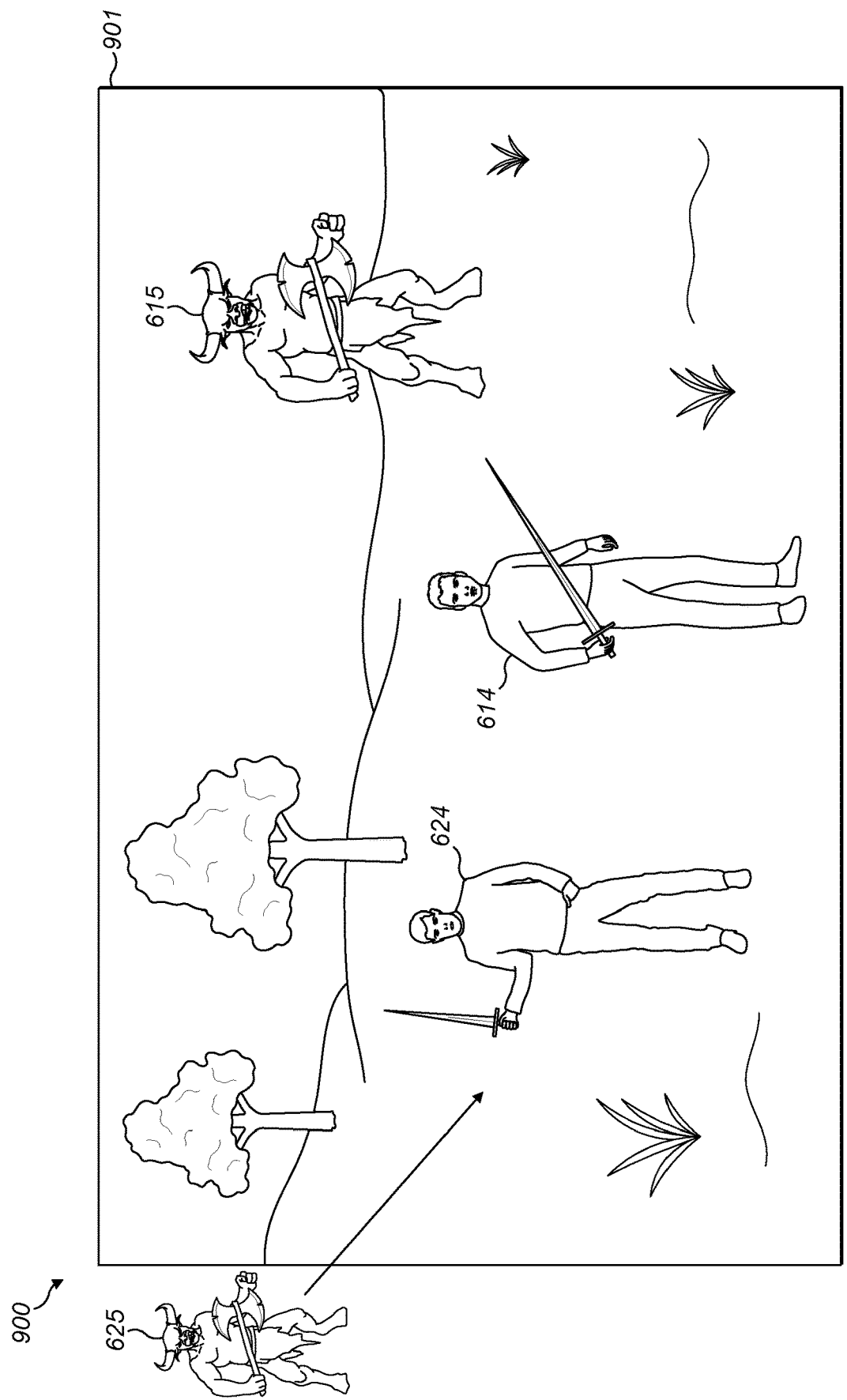
FIG. 9b depicts a development of the screenshot of FIG. 9a, with the player character having been joined by an additional player character.

A variant of the example illustrated in FIGS. 6 and 7 is depicted in FIGS. 9a and 9b, which depict screenshots 900 of a user's field of view 901 from a third-person perspective, including a first player character 614 controlled by the user. In practice, such video screens may be generated by the image generator 111/211 and virtual camera control unit 112/212, under the control of processor 104/204 (see FIGS. 3 and 4). It will of course be appreciated that, in the present FIGS. 9a and 9b, black and white line drawings are used to represent what would typically be displayed to the user as rendered video (preferably photorealistic video rendering) in the game.

FIG. 9a shows the first player character 614 engaging in battle with a first enemy character 615.

FIG. 9b shows the first player character 614 having been joined by a second player character 624, controlled by a respective user who has dropped-in to the game. In the manner outlined above with reference to FIG. 5, in response to this increase in the number of player characters the enemy generating unit 114/214 increases the rate of generation of the enemy characters, resulting in the generation of a second enemy character 625 who can be seen in FIG. 9b approaching the battle, initially from outside of the user's field of view 901. The direction of motion of the second enemy character 625 is depicted with an arrow pointing towards the player characters 614, 624.

Drop-In and Drop-Out of Player Characters

Figure 10A:
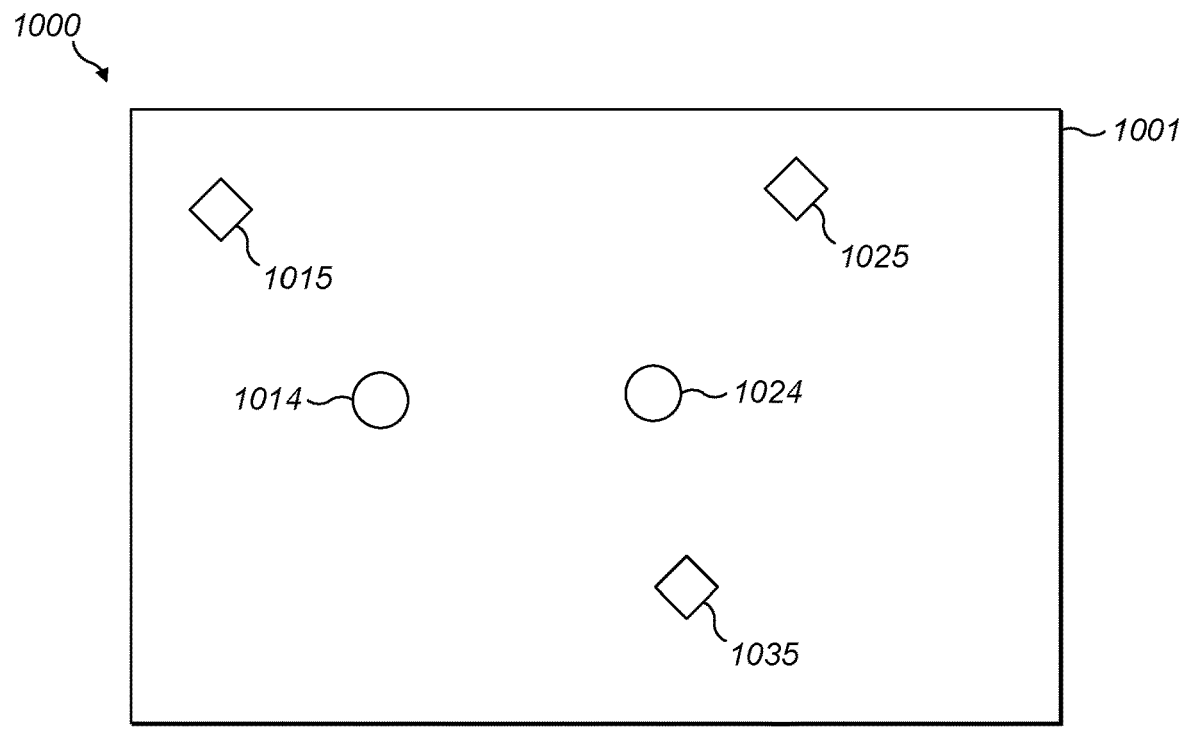
FIG. 10a depicts a schematic view, from above, of a region within a game phase in which player characters are battling with enemy characters.

FIG. 10a shows a schematic view 1000 from above, of a region 1001 within a game phase 1001 in which a first player character 1014 and a second player character 1024 are surrounded in battle by a first enemy character 1015, a second enemy character 1025 and a third enemy character 1035.

Figure 10B:
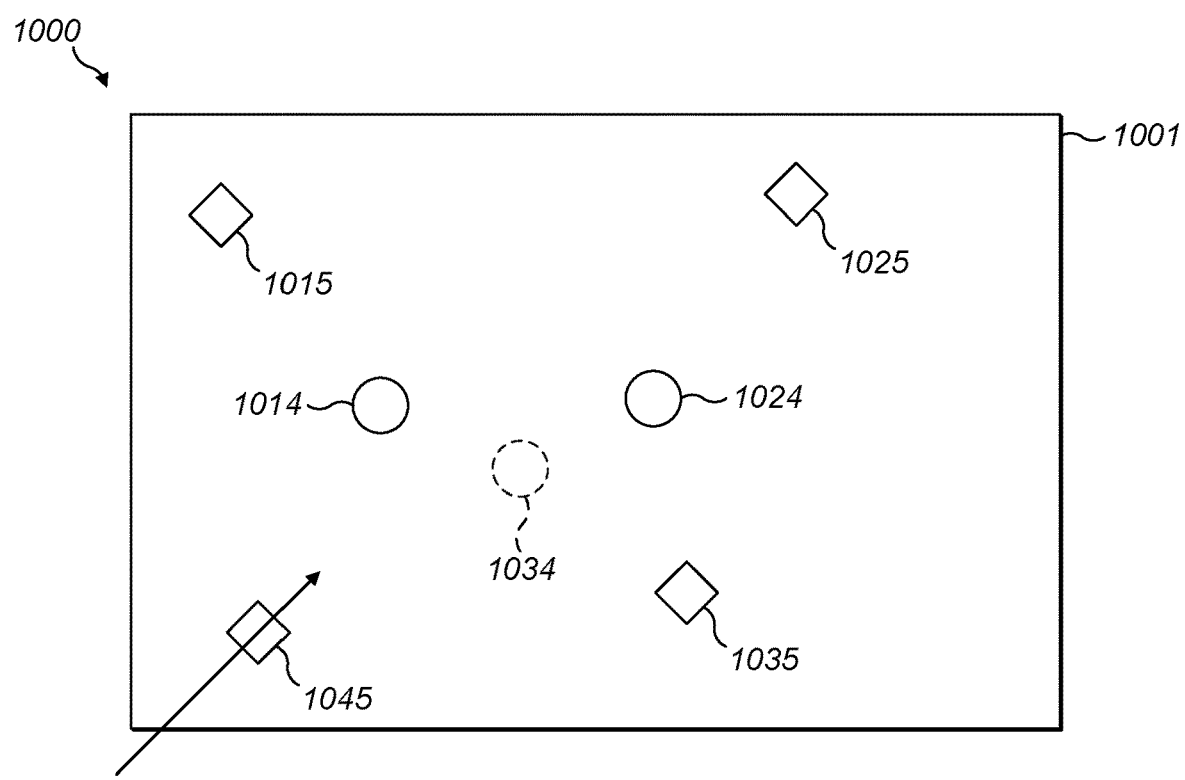
FIG. 10b depicts a development of the schematic view of FIG. 10a, in which a new player character is joining the battle.

FIG. 10b shows the view of FIG. 10a with the addition of a third player character 1034 who has dropped-in to that game phase. As can be seen in FIG. 10b, in response to the third player character 1034 joining the game phase the enemy generating unit 114/214 generates a fourth enemy character 1045 who travels towards the player characters 1014, 1024, 1034 as shown by the arrow (in a similar manner to the enemy character 625 in FIG. 9b), to join the battle and rebalance the gameplay.

Figure 10C:
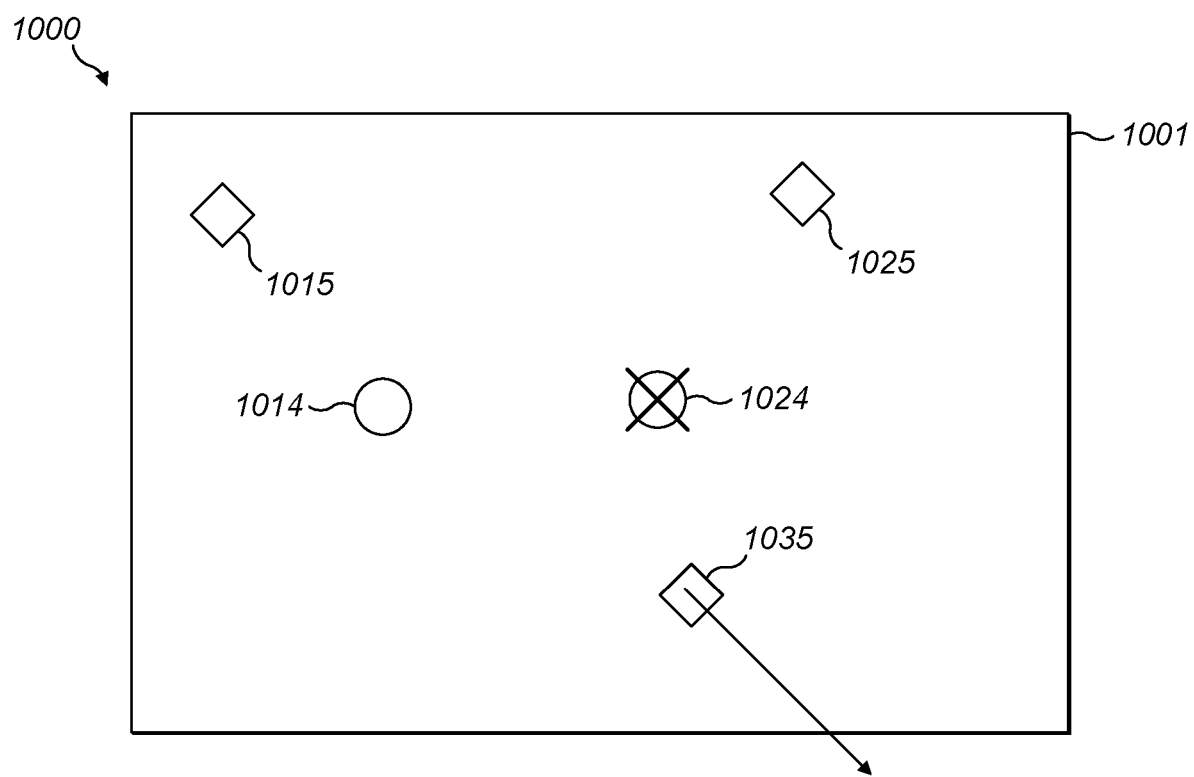
FIG. 10c depicts a development of the schematic view of FIG. 10a, in which a player character is leaving the battle.

In alternative circumstances as shown in FIG. 10c, the second player character 1024 drops-out of the game, as shown by the cross through the second player character 1024. In the manner outlined above with reference to FIG. 5, in response to this decrease in the number of player characters the enemy generating unit 114/214 decreases the rate of generation of the enemy characters. In the first instance, this is manifested by the third enemy character 1035 leaving the battle, thereby decreasing the difficulty to a new (lower) enemy difficulty.

Deferred Application of New Enemy Difficulty

In the implementations described above, the application of a new enemy difficulty generally occurs in the same phase as that in which the change in the number of player characters is detected.

However, in alternative implementations the enemy difficulty determining unit 105/205 may be configured to detect a change in the number of player characters in a first phase and to determine a new enemy difficulty, for application in a second phase, in dependence on said change in the number of player characters in the first phase. That is to say, the enemy difficulty is kept constant whilst the player characters remain in the first phase, despite player drop-in or drop-out having occurred in the first phase, and application of the new enemy difficulty is deferred until the player characters enter a subsequent (second) phase.

Consequently, enemies in the player characters' current phase (the first phase) are not suddenly affected by the new enemy difficulty, which could otherwise appear incongruous to the users. Instead, new enemies in the subsequent phase (the second phase) are affected by the new enemy difficulty, thereby avoiding subjecting the users to a sudden change in the enemies.

In preferred embodiments the second phase is the phase immediately subsequent to the first phase in the progress of the game.

Thus, the enemy modulating unit 113/213 may be configured to modulate the enemy difficulty of the second gaming phase to the determined new enemy difficulty.

To implement this, the enemy generating unit 114/214 may be configured to generate at least one enemy character at a rate, and/or having an enemy attribute, in the second gaming phase according to the determined new enemy difficulty.

Use of Spawn Points

As those skilled in the art will appreciate, the term "spawn point" may be used to refer to a location in the virtual multiplayer game world at which enemy characters are generated (i.e. "spawned"). Conversely, the term "despawning", in the context of the present invention, refers to the removal of an enemy character from the virtual multiplayer game world.

In the exemplary implementations described above, the new enemy characters are generated or removed directly in response to a change in the number of player characters. This may be done (but not necessarily) using spawn points.

In other implementations which use spawn points, the generation of enemy characters at a rate according to a new enemy difficulty may comprise increasing or decreasing the number of spawn points in the vicinity of the player characters, or increasing or decreasing the rate of respawn from an existing or fixed number of spawn points.

Enemy Character Modulation

In some embodiments, following a change in the number of player characters, the rate of generation of enemy characters may stay the same but the attributes of the enemy characters may change, to thereby rebalance the gameplay.

For example, if the number of player characters decreases, the enemy characters may be modulated (by the enemy modulating unit 113/213) by decreasing one or more of the enemy characters' attributes (e.g. health, damage, resistance, armour, type, strength, equipment, skill or ability) such that the enemy characters become easier to defeat, but without decreasing their number.

In some implementations, the modulation of such enemy character attributes is applied to existing enemy characters. Alternatively, in other implementations the modulation of enemy attributes may be applied to newly-generated enemy characters, e.g. in the player characters' current phase of the game, or in the next phase that the player characters enter.

Illustrative Tables

Referring to FIGS. 11 to 15, the enemy difficulty determining unit 105/205, the enemy modulating unit 113/213 and the enemy generating unit 114/214 may retrieve stored data from various tables for use in the determination of the new enemy difficulty and generation of enemy characters. Examples of such tables will now be discussed in detail:

Player Character Table (FIG. 11)

FIG. 11 shows a player character table which contains data relating to the player characters who are currently active in the virtual multiplayer game world. By way of example, the table in FIG. 11 includes an identification of the player character with a player character ID. This may be a username or simply a unique number.

In the example provided in FIG. 11 the player character IDs are "Player 1" and "Player 2" and for each player the host status, connection speed ranking, game level reached, player character experience, player character skill level, player character ability and player character strength value are stored.

"Host status" indicates whether or not each player's respective computer apparatus is at least partially hosting the video game, and the "connection speed ranking" indicates the order of the connection speed of that computer apparatus to the network, "1" being the fastest.

"Game level reached" indicates the highest level reached by each player in the video game, "player character experience" indicates how much experience the respective player character has accumulated in the video game, and "player character skill level" and "player character ability" indicate further attributes of the player character (in respect of the type of fighting in which the player character is skilled, e.g. close-combat melee fighting, or longer-distance archery).

"Player character strength value" is an aggregate value which denotes the overall strength of the player character, for use by the enemy difficulty determining unit 105/205 when determining a new enemy difficulty. The player character strength value may be determined according to the procedural flow diagram shown in FIG. 16, which is described in more detail below.

Enemy Difficulty Table (FIG. 12)

FIG. 12 shows an enemy difficulty table which contains a series of values which may be used by the system to determine a new enemy difficulty in accordance with embodiments of the invention.

The table includes an indication of the number of player characters, the player character strength value, the game level and a resulting enemy difficulty value.

The "number of player characters" may be an indication of the number of player characters in the virtual multiplayer game world or in a particular gaming phase.

Figure 16:
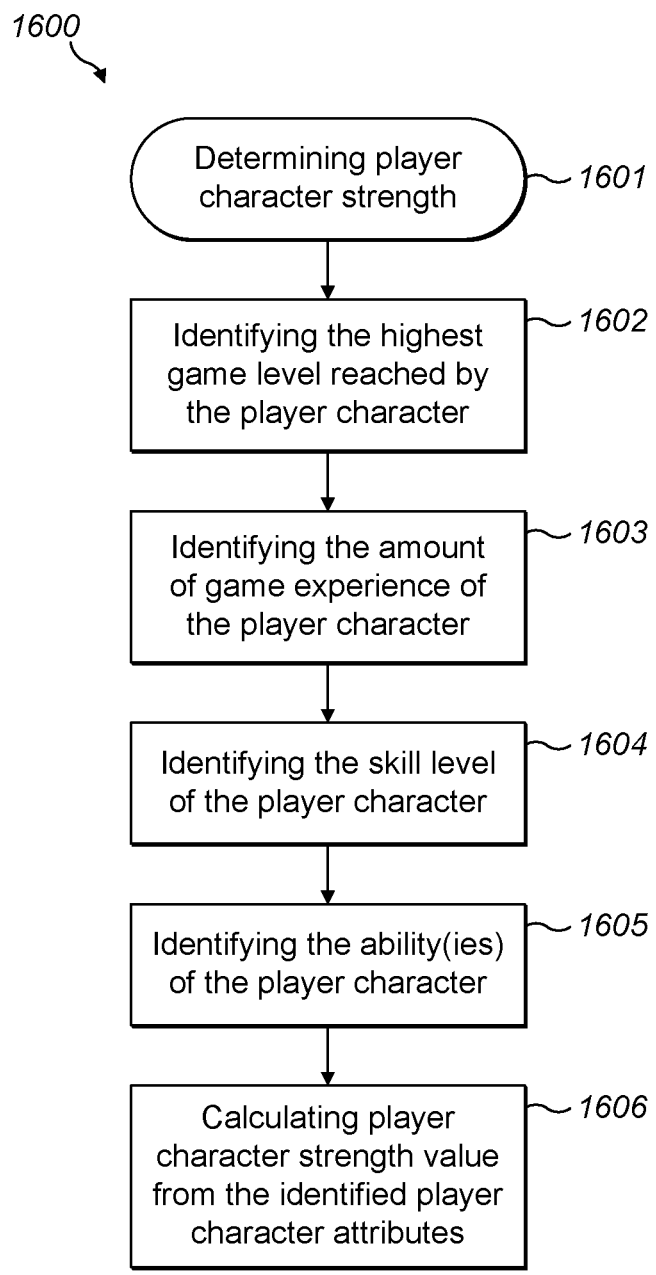
FIG. 16 is a procedural flow diagram of a player character strength determining routine.

The "player character strength value" is an aggregate of the individual player character strength values as indicated in the table of FIG. 11 and mentioned above, and as determined by the process shown in FIG. 16.

The "game level" is an indication of the overall game level for the given phase or gaming arena, as described in more detail above, particularly with reference to FIG. 8b.

The resulting "enemy difficulty value" provides a numerical indication to the system of a suitable new enemy difficulty. The enemy difficulty value is determined by the system by conflating the values given in the preceding columns, i.e. the number of player characters, the player character strength value and the game level.

Conflation

According to certain implementations of the invention, the enemy modulating unit 113/213 may be configured to conflate (essentially superimpose) the modulation of the enemy difficulty due to a change in the number of player characters with a further modulation of the enemy difficulty due to other in-game factors.

For example, the enemy modulating unit 113/213 may be configured to conflate the modulation of the enemy difficulty due to a change in the number of player characters with a further modulation of the enemy difficulty due to a change in the game level of the video game.

Alternatively, the enemy modulating unit 113/213 may be configured to conflate the modulation of the enemy difficulty due to a change in the number of player characters with a further modulation of the enemy difficulty due to a change in the experience, skill and/or ability of at least one of the player characters.

As a further alternative, the enemy modulating unit 113/213 may be configured to conflate the modulation of the enemy difficulty due to a change in the number of player characters with a further modulation of the enemy difficulty due to a change in the gaming arena/phase of the player characters.

Accordingly, a reduction in the enemy difficulty due to a decrease in the number of player characters may be at least partially offset by an increase in the enemy difficulty due to an increase in the game level of the video game or the progression of the player characters into a new gaming arena or phase.

Alternatively, a reduction in the enemy difficulty due to a decrease in the number of player characters may be at least partially offset by an increase in the enemy difficulty due to an increase in the experience, skill or ability of at least one of the player characters (including in respect of a recently-joined player character).

Returning to the table shown in FIG. 12, eight representative rows of values have been provided to show how enemy difficulty values may change as a function of a change in the number of player characters (e.g. from 1 to 4), the game level (e.g. 3 or 4) and the player character strength value. However in practical implementations this table may consist of a single row of values which is updated in real time and indicates the enemy difficulty value for a given moment of gameplay.

Player Character Count Table (FIG. 13)

The table shown in FIG. 13 contains a count of player characters currently in each individual gaming phase, and also includes (as the sum of the preceding values) the total number of player characters in the overall arena of the virtual multiplayer game world.

This count may be used by other elements of the system, for example to determine a new enemy difficulty as described above, and as used within the table of FIG. 12, as also described above.

Enemy Difficulty Table (FIG. 14)

The enemy difficulty table shown in FIG. 14 includes the enemy difficulty value, as determined above with reference to FIG. 12, an enemy character generation rate and an enemy character attribute value.

This table may be used by the enemy generating unit 114/214 to look-up a suitable enemy character generation rate and a suitable enemy character attribute value for a determined enemy difficulty.

In the present example the enemy character attribute is represented as a numerical value which provides a look-up reference to table FIG. 15, described below, for determining the enemy attributes of the enemy characters to be generated by the enemy generating unit 114/214. The enemy character generation rate is a measure of the frequency with which the new enemy characters will be generated.

Enemy Attribute Lookup Table (FIG. 15)

Finally, FIG. 15 shows an enemy character attribute look-up table which may be accessed by the enemy generating unit 114/214 to determine one or more enemy attributes which it may bestow upon an enemy character, according to a determined new enemy difficulty.

As shown in FIG. 15, the at least one enemy attribute may comprise one or more of: enemy health, enemy damage, enemy resistance, enemy armour, enemy type, enemy strength, enemy equipment, enemy skill and enemy ability. Indeed, the at least one enemy attribute may comprise all of the above-listed attributes.

With the example shown in FIG. 15, each enemy character attribute value (as extracted from the enemy difficulty table of FIG. 14) has a corresponding set of attributes which define the enemy characters to be created.

In the case of enemy health, enemy damage, enemy resistance, enemy armour, and enemy strength, these are numerical values, as those skilled in the art will appreciate.

In the case of enemy type, this is an indication of, for example, the size, shape and look of the enemy character, for a specified enemy character attribute value. The enemy characters shown in FIGS. 9a and 9b are so-called "tanks", for example, with such a character type being specified when the enemy character attribute value in FIG. 15 is 3. On the other hand, when the enemy character attribute value is 1 or 2, smaller less fearsome enemy characters (e.g. so-called "pawns") may be specified, as are better matched to less able player characters, for example.

Determining a Player Character Strength

As illustrated by the flow diagram 1600 in FIG. 16, the aggregate "player character strength value" (as given in the table of FIG. 11, and as used in the table of FIG. 12) may be determined 1601 by the following procedure, carried out by the enemy difficulty determining unit 105/205:

Firstly, the highest game level reached by the player character is identified 1602, by querying the stored information in the player character table as shown in FIG. 11.

Subsequently, the amount of game experience of the player character is identified 1603, along with the skill level of the player character 1604 and the ability/abilities of the player character 1605, again from information stored in the player character table as shown in FIG. 11.

This information is then used by the enemy difficulty determining unit 105/205 to calculate 1606 a player character strength value from the above-identified player character attributes. The calculated player character strength value is then used in the table of FIG. 12, for determining the enemy difficulty value.

Transfer of Hosting Responsibility

As mentioned above, at least part of the video game may be hosted on at least one of the computer apparatus operated by at least one of the players—for example, the first computer apparatus, of the first player.

The video game program may cause the computer apparatus to function as a hosting transfer unit, operable to transfer hosting responsibility from said computer apparatus to another player's computer apparatus.

The hosting transfer unit may be configured such that, in the event that the first player initiates disconnection of the first computer apparatus from the network, hosting of the game is at least partially transferred to the computer apparatus of another player still connected to the network. This is ideally performed before the first computer apparatus completes its disconnection from the network, so as to provide continuity of the game for the other players.

Alternatively, in the event that a new player drops-in to the video game and the said new player connects to the network with a computer apparatus capable of providing faster hosting, the hosting transfer unit may be configured to at least partially transfer hosting of the game to the new player's computer apparatus.

In some embodiments, the enemy difficulty may at least initially be based on a game level reached by the player of the computer apparatus that is currently hosting the game.

Modifications and Alternatives

Detailed embodiments and some possible alternatives have been described above. As those skilled in the art will appreciate, a number of modifications and further alternatives can be made to the above embodiments whilst still benefiting from the inventions embodied therein. It will therefore be understood that the invention is not limited to the described embodiments and encompasses modifications apparent to those skilled in the art lying within the scope of the claims appended hereto.

The invention claimed is:

1. A non-transitory computer-readable medium including a program which is executed by at least a first and second computer apparatus in a network to provide a video game that is progressed by at least first and second players using said first and second computer apparatus respectively controlling at least first and second player characters in a virtual multiplayer game world in which the difficulty of the game is defined by at least an enemy difficulty, wherein the virtual multiple player game world comprises at least one gaming arena and has at least one game level, the program causing the computer apparatus to function as:

an enemy difficulty determining unit configured to detect a change in the number of player characters and to determine a new enemy difficulty in dependence on the change in the number of player characters;

an enemy modulating unit configured to modulate the enemy difficulty to the determined new enemy difficulty; and an enemy generating unit configured to generate at least one enemy character at a rate, and/or having an enemy attribute, according to the determined new enemy difficulty;

wherein the at least one gaming arena comprises at least a first gaming phase that the player characters are currently in, and a second gaming phase that the player characters may subsequently enter, the second gaming phase being in a separate region from the first gaming phase within the gaming arena; and wherein the enemy difficulty determining unit is further configured to detect a change in the number of player characters in the first gaming phase and to determine a new enemy difficulty, for application in the second gaming phase but not in the first gaming phase, in dependence on said change in the number of player characters in the first gaming phase.

2. The non-transitory computer-readable medium according to claim 1, wherein the enemy generating unit is configured to decrease the rate of generation of enemy characters in response to the enemy difficulty determining unit detecting a reduction in the number of player characters, and/or to increase the rate of generation of enemy characters in response to the enemy difficulty determining unit detecting an increase in the number of player characters.

3. The non-transitory computer-readable medium according to claim 1, wherein the enemy modulating unit is configured to modulate at least one enemy attribute of the enemy characters in response to the enemy difficulty determining unit detecting a change in the number of player characters.

4. The non-transitory computer-readable medium according to claim 1, wherein the enemy modulating unit is configured to apply the new enemy difficulty to existing enemy characters.

5. The non-transitory computer-readable medium according to claim 1, wherein the enemy generating unit is configured to apply the new enemy difficulty to newly-generated enemy characters.

6. The non-transitory computer-readable medium according to claim 1, wherein the at least one enemy attribute comprises one or more of: enemy health, enemy damage, enemy resistance, enemy armour, enemy type, enemy strength, enemy equipment, enemy skill and enemy ability.

7. The non-transitory computer-readable medium according to claim 1, wherein the enemy modulating unit is further configured to modulate the enemy difficulty of the second gaming phase to the determined new enemy difficulty.

8. The non-transitory computer-readable medium according to claim 7, wherein the enemy generating unit is further configured to generate at least one enemy character at a rate, and/or having an enemy attribute, in the second gaming phase according to the determined new enemy difficulty.

9. The non-transitory computer-readable medium according to claim 1, wherein the enemy difficulty modulating unit is further configured to conflate said modulation of the enemy difficulty with a further modulation of the enemy difficulty due to a change in the game level of the video game.

10. The non-transitory computer-readable medium according to claim 1, wherein the enemy difficulty modulating unit is further configured to conflate said modulation of the enemy difficulty with a further modulation of the enemy difficulty due to a change in the experience, skill and/or ability of at least one of the player characters.

11. The non-transitory computer-readable medium according to claim 1, wherein the enemy difficulty modulating unit is further configured to conflate said modulation of the enemy difficulty with a further modulation of the enemy difficulty due to a change in the gaming arena of at least one of the player characters.

12. The non-transitory computer-readable medium according to claim 1, wherein the game is at least partially hosted on the first computer apparatus and wherein the program further causes the computer apparatus to function as a hosting transfer unit, operable to transfer hosting responsibility from the first computer apparatus to another player's computer apparatus.

13. The non-transitory computer-readable medium according to claim 12, wherein the hosting transfer unit is configured such that, in the event that the first player initiates disconnection of the first computer apparatus from the network, hosting of the game is at least partially transferred to the second computer apparatus.

14. The non-transitory computer-readable medium according to claim 12, wherein the hosting transfer unit is configured such that, in the event that a third player joins the game, over the network, using a third computer apparatus capable of providing faster hosting than the first computer apparatus, hosting of the game is at least partially transferred to the third computer apparatus.

15. The non-transitory computer-readable medium according to claim 12, wherein the enemy difficulty is at least initially based on a game level reached by the player of the computer apparatus that is currently hosting the game.

* * * * *